US012799277B2

(12) United States Patent
Busby

(10) Patent No.: US 12,799,277 B2

(45) Date of Patent: Nov. 17, 2026

(54) APROTIC CATALYSTS FOR THE HYDROLYSIS/CONDENSATION OF ORGANOALKOXYSILANES

(71) Applicant: Novinium, LLC, Kent, WA (US)

(72) Inventor: David C. Busby, Midland, MI (US)

(73) Assignee: Novinium, LLC, Kent, WA (US)

(*) Notice: Subject to any disclaimer, the term of this patent is extended or adjusted under 35 U.S.C. 154(b) by 813 days.

(21) Appl. No.: 18/078,016

(22) Filed: Dec. 8, 2022

(65) Prior Publication Data

US 2023/0183426 A1 Jun. 15, 2023

Related U.S. Application Data

(60) Provisional application No. 63/288,986, filed on Dec. 13, 2021.

(51) Int. Cl.

*C08G 77/08* (2006.01)
*B01J 29/82* (2006.01)
*B01J 31/02* (2006.01)

(52) U.S. Cl.

CPC .............. *C08G 77/08* (2013.01); *B01J 29/82* (2013.01); *B01J 31/0227* (2013.01)

(58) Field of Classification Search

CPC ........ C08G 77/08; B01J 29/82; B01J 31/0227
See application file for complete search history.

(56) References Cited

U.S. PATENT DOCUMENTS

| | | | |
|---|---|---|---|
| 4,766,011 A | 8/1988 | Vincent et al. | |
| 5,372,841 A | 12/1994 | Kleyer et al. | |
| 7,700,871 B2 | 4/2010 | Bertini et al. | |
| 8,101,034 B2 * | 1/2012 | Bertini .................. | H01B 7/285 156/48 |
| 8,656,586 B2 | 2/2014 | Bertini et al. | |
| 10,351,742 B2 | 7/2019 | Brown et al. | |

(Continued)

FOREIGN PATENT DOCUMENTS

CN 103804687 A * 5/2014

OTHER PUBLICATIONS

International Search Report and Written Opinion for Application No. PCT/US2022/81303, mailed Mar. 3, 2023, filed Dec. 9, 2022, 18 pages.

*Primary Examiner* — Jiangtian Xu

(74) *Attorney, Agent, or Firm* — Barry L. Davison; Davis Wright Tremaine LLP

(57) ABSTRACT

Provided are methods for hydrolyzing and condensing organooxysilanes using aprotic catalysts comprising silanes containing one or more groups that are the anions derived from strong acids, and/or aprotic catalysts comprising aprotic derivatives of strong acids such as acid esters, acid chlorides, or acid anhydrides. The methods are applicable, e.g., to restoration of dielectric properties of electrical cables by injecting a dielectric enhancement fluid composition containing one or more of the disclosed aprotic catalysts into the interior of an electrical cable having a central stranded conductor encased in a polymeric insulation jacket and having an interstitial void volume in the region of the conductor. Relative to use of protic strong acid catalysts, the disclosed aprotic catalyst methods have utility to reduce or eliminate corrosion of the conductor during treatment with the dielectric enhancement fluid.

12 Claims, 6 Drawing Sheets

(56) References Cited

U.S. PATENT DOCUMENTS

| | | | | |
|---|---|---|---|---|
| 2012/0282776 | A1* | 11/2012 | Kim | G03F 7/09 524/588 |
| 2014/0039089 | A1* | 2/2014 | Cook | C08G 77/08 524/588 |
| 2016/0184810 | A1 | 6/2016 | Wright et al. | |
| 2024/0377745 | A1* | 11/2024 | Shibayama | G03F 7/11 |

* cited by examiner

APROTIC CATALYSTS FOR THE HYDROLYSIS/CONDENSATION OF ORGANOALKOXYSILANES

CROSS-REFERENCE TO RELATED APPLICATION

This application claims priority to U.S. Provisional Patent Application No. 63/288,986 filed Dec. 13, 2021, entitled "APROTIC CATALYSTS FOR THE HYDROLYSIS/CONDENSATION OF ORGANOALKOXYSILANES IN CABLE REJUVENATION FLUIDS", which is hereby incorporated herein by reference in its entirety and for all purposes.

FIELD OF THE INVENTION

The present invention relates generally to methods for hydrolyzing and condensing organooxysilanes, more particularly to use of aprotic catalysts for hydrolyzing and condensing organooxysilanes, and even more particularly to application of the methods to restoring the dielectric properties of an electrical cable, comprising introducing (e.g., injecting) a catalyzed dielectric enhancement fluid composition into the cable's interior.

BACKGROUND OF THE INVENTION

Power Cable:

Power cables are generally constructed by a metallic conductor surrounded by polymeric insulation. For the purpose of illustration, a typical construction of a prior art medium voltage power cable 100 is shown in FIG. 1. Typical construction for the medium voltage power cable 100 comprises a conductor 102 made of aluminum or copper. Often the conductor 102 will be comprised of multiple individual conductor strands 104 that are arranged in concentric layers. The space between the individual conductor strands is known as the interstitial volume 106. Surrounding the conductor is a conductor shield 108, a semi-conducting layer often included in the design of medium and high-voltage power cables to reduce electrical stress in the insulation. Surrounding the conductor or conductor shield is insulation 110 that has a substantial dielectric strength and is typically made of polyethylene (PE), cross-linked polyethylene (XLPE) or ethylene-propylene rubber (EPR). Surrounding the insulation 110 is an insulation shield 112, a second semi-conducting layer often included in medium and high-voltage power cables to reduce electrical stress in the insulation. Surrounding the insulation shield 112 is a ground 114 used to carry stray current and drain capacitive charge from the cable.

The ground 114 may consist of multiple conductors arranged circumferentially around the cable called concentric neutrals 116. The outermost layer of the cable is the optional jacket 118 that provides mechanical protection to the cable. The construction of medium-voltage cable rated from 5 kV to 46 kV is further described in ICEA S-94-649-2000. While a medium voltage power cable with a jacketed concentric neutral construction has been shown, it should be appreciated that other forms of power cable exist, such as bare-concentric cable, tape-shield cable, low voltage cable, armored cable, submarine cable and high-voltage cable. Such cables may see the addition of elements such as armor or the subtraction of elements such as semi-conductive shields or neutrals.

Restoration of the dielectric properties of in-service electrical power cables is well known. The general method comprises injecting a dielectric enhancement fluid into the interstitial void space associated with the conductor geometry of the cable.

Typically, the injected fluid is an organoalkoxysilane monomer which subsequently diffuses radially outward through the polymeric insulation jacket to fill the deleterious micro-voids ("trees") which form therein as a result of exposure to high electric fields and/or adventitious water. The organoalkoxysilane can oligomerize within the insulation, the shields, and the interstitial void volume of the cable by first reacting with adventitious water.

Oligomerization of the organoalkoxysilane retards the exudation of fluid from the insulation and micro-voids of the cable. An early method of this type, wherein the dielectric enhancement fluid was an aromatic alkoxysilane, was described by Vincent et al. in U.S. Pat. No. 4,766,011. This disclosure teaches the optional inclusion of a "hydrolysis condensation catalyst" as a part of the treatment fluid formulation to promote the above-mentioned oligomerization. A variation of the '011 patent method, which employs a mixture of an anti-treeing agent, such as an organoalkoxysilane, and a rapidly diffusing water-reactive component as the dielectric enhancement fluid, also teaches the inclusion of such a catalyst, albeit with less emphasis. This method has enjoyed commercial success for more than a decade (see U.S. Pat. No. 5,372,841). However, even though the above patent references recognized the benefit of including a catalyst and the importance of preventing the exudation of the dielectric property-enhancing fluid from the cable, it disclosed the use of only certain organometallic catalysts such as tetraisopropyltitanate.

U.S. Pat. No. 7,700,871 disclosed the use of strong acid catalysts having $pK_A$ values≤2.1 for the hydrolysis and condensation of organoalkoxysilanes used in an electric cable rejuvenation fluid. According to the patent, $pK_A$ has its usual definition of the negative logarithm (Base 10) of the equilibrium constant (KA) for the dissociation of the acid. Preferred acids included methanesulfonic acid, trifluoromethanesulfonic acid, benzenesulfonic acid, sulfuric acid, nitric acid, trifluoracetic acid, dichloroacetic acid and phosphoric acid.

U.S. Pat. No. 7,700,871 also notes that it is desirable to employ an amount of acid catalyst which results in the retention of essentially all hydrolysis/condensation products in the cable.

In U.S. Pat. No. 7,700,871, a number of organometallic catalysts and acid catalysts with a range of $pK_A$s were tested in a "model cable" setup described as follows: "An approximately 12 inch-long polyethylene (LDPE) tube having an inner diameter (ID) of about 1/16 inch and an outer diameter (OD) of about ⅛ inch was sealed at one end by melting the end shut with a soldering iron. The tube was weighed and an approximately 11.5 inch-long aluminum wire having a diameter of about 0.0508 inch was weighed and inserted into the tube. This combination has approximately the same relative geometry as a typical AWG 1/0, 15 kV, 100% insulation cable with respect to the ratio of interstitial volume to polyethylene volume and is therefore a good surrogate for the latter. A numbered rectangular aluminum identification tag was weighed and the tube/wire combination was inserted through one of two holes in the tags. The tube, wire and identification tag were again weighed as an assembly. A fluid composition (i.e., either a TEM (tolylethylmethyldimethoxysilane) control fluid, or a TEM composition containing about 0.13 mole % of a catalyst, as further described below) was injected into the open end of the tube with the aid of a hypodermic syringe. The assembly was again weighed to provide the weight of the fluid contained in the wire/tube combination. The open end of the tube was inserted through the second hole in the tag and melted shut, as described above, and the assembly was again weighed to provide a final amount of the fluid sealed within the tube. Three such wire/tube assemblies were prepared for each of the fluid compositions tested below and these were then placed into a water bath held at 55 °C. Periodically, each assembly was removed from the water bath, blotted dry and weighed at room temperature to calculate the amount of fluid composition (as a percentage of initial fluid weight) remaining in the tube (i.e., the initial TEM plus any hydrolysis/condensation products thereof that did not diffuse out of the tube)". The value of the percentage of initial fluid weight remaining in the tube is hereinafter referred to as "cable retention".

A plot from U.S. Pat. No. 7,700,871 (FIG. 2), showing elapsed time vs. % fluid remaining, demonstrates that a strong acid, trifluoromethane sulfonic acid, provided significantly better retention of TEM hydrolysis and condensation products in the "model cable" setup that any of the organometallic catalysts of titanium or tin that were tested.

SUMMARY OF THE INVENTION

Disclosed are novel methods for hydrolyzing and condensing organooxysilanes using aprotic catalysts. A first aprotic catalyst type comprises silanes containing one or more groups that are the anions derived from strong acids. A second aprotic catalyst type comprises aprotic derivatives of strong acids such as acid esters, acid chlorides, or acid anhydrides. The disclosed methods of hydrolyzing and condensing organooxysilanes can be applied, for example, to restoration of the dielectric properties of an electrical cable by injecting a dielectric enhancement fluid composition containing one or more of the disclosed aprotic catalysts into the interior of an electrical cable having a central stranded conductor encased in a polymeric insulation jacket and having an interstitial void volume in the region of the conductor.

Further, the above cable restoration methods can be practiced by injecting the composition into the cable at an elevated pressure and confining it in the interstitial void volume of the cable at a residual elevated pressure.

In the methods, aprotic catalysts of the present invention can achieve similar or improved retention of the dielectric enhancement fluid in the cable insulation compared to strong acid catalysts such as dodecylbenzesulfonic acid (DDBSA), and/or can provide reduced corrosion, and/or can reduce or eliminate the need for inclusion of anti-oxidants in the dielectric enhancement fluid compositions.

Embodiments of the disclosure can be described in view of the following clauses:

1. A method for enhancing the dielectric properties of an electrical cable having a central stranded conductor encased in a polymeric insulation jacket and having an interstitial void volume in the region of the conductor, the method comprising introducing a dielectric enhancement fluid composition into the interstitial void volume, wherein the composition comprises:

(a) at least one organoalkoxysilane; and (b) one or more aprotic hydrolysis/condensation catalysts for said organoalkoxysilane(s), selected from:

$Y_pZ_qSi(A^1)_n$, wherein formula (i)

n=1 to 3, p+q=4−n),

Y is an organo group $R^1$, and Z is an oxyorgano group $OR^2$ where, in each instance, $R^1$ and $R^2$ are independently selected from alkyl, aryl, or alkaryl, any of which alkyl, aryl, or alkaryl groups may also contain one or more hetero atoms selected from nitrogen, phosphorus, oxygen, sulfur, chlorine, bromine, fluorine, and iodine, and $A^1$ is an anion of a monoprotic strong acid selected from sulfonate, nitrate, chloride, bromide, or iodide; and/or $(Y_pZ_qSi)_2A^2$, wherein formula (ii)

p+q=3,

Y and Z are defined as for formula (i), and $A^2$ is an anion of a diprotic strong acid selected from sulfate or chromate; and/or $(Y_pZ_qSi)_3A^3$, wherein formula (iii)

p+q=3

Y and Z are defined as for formula (i), and $A^3$ is an anion of a triprotic strong acid selected from phosphate; and/or formula (iv)

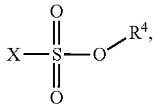

wherein

X is F, Cl, $R^3$, or —$OR^5$, where $R^5$ is methyl or ethyl, and $R^3$ and $R^4$ are independently defined as for $R^1$; and/or formula (v)

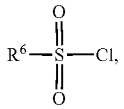

wherein $R^6$ is defined as for $R^1$; and/or formula (vi)

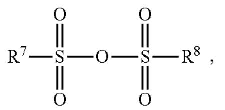

wherein $R^7$ and $R^8$ are independently defined as for $R^1$; and/or methyl nitrate, ethyl nitrate, dinitrogen pentoxide, sulfur trioxide, and phosphorus pentoxide, wherein oligomerization of the organoalkoxysilane monomers is catalyzed and dielectric properties are enhanced by retained oligomers.

2. The method of clause 1, wherein independently for $R^1$, $R^2$, $R^3$, $R^4$, $R^6$, $R^7$ and $R^8$:

alkyl is linear or branched $C_{1-6}$ alkyl;

aryl is phenyl or substituted phenyl having one or more substituents independently selected from linear or branched $C_{1-12}$ alkyl, or naphthyl; and alkaryl is —$C_{1-6}$ alkyl phenyl, any of which alkyl, aryl, or alkaryl groups may also contain one or more hetero atoms selected from nitrogen, phosphorus, oxygen, sulfur, fluorine, chlorine, bromine, and iodine.

3. The method of clause 1 or 2, wherein independently for $R^1$, $R^2$, $R^3$, $R^4$, $R^6$, $R^7$ and $R^8$:

alkyl is selected from methyl, ethyl, isopropyl, and tert-butyl;

aryl is selected from phenyl, tolyl, naphthyl, and dodecylphenyl; and alkaryl is selected from phenethyl, benzyl, and phenylisopropyl; any of which alkyl, aryl, or alkaryl groups may also contain one or more hetero atoms selected from nitrogen, phosphorus, oxygen, sulfur, fluorine, chlorine, bromine, and iodine.

4. The method of any one of clauses 1-3, wherein $A^1$ in formula (i) is the anion of a monoprotic acid selected from methanesulfonate, trifluoromethanesulfonate, benzenesulfonate, p-toluenesulfonate, chlorosulfonate, fluorosulfonate, perfluorobutanesulfonate, nitrate, chloride, bromide, and iodide.

5. The method of any one of clauses 1-4, wherein $A^2$ in formula (ii) is sulfate.

6. The method of any one of clauses 1-5, wherein $A^3$ in formula (iii) is the anion of a triprotic strong acid selected from phosphate.

7. The method of any one of clauses 1-6, wherein the one or more aprotic hydrolysis/condensation catalyst comprises at least one selected from TIPS triflate (triisopropylsilyltrifluoromethanesulfonate), DTBS ditriflate (Di-tert-butylsilylbis(trifluoromethanesulfonate), and TTMSP (tris(trimethylsilyl)phosphate).

8. The method of any one of clauses 1-7, wherein the one or more aprotic hydrolysis/condensation catalysts comprises at least one acid ester selected from methyl methanesulfonate, ethyl methanesulfonate, methyl trifluoromethanesulfonate, methyl ethanesulfonate, isopropyl ethanesulfonate, methyl octanesulfonate, methyl benzenesulfonate, ethyl benzenesulfonate, methyl p-toluenesulfonate, and ethyl p-toluenesulfonate.

9. The method of any one of clauses 1-8, wherein the one or more aprotic hydrolysis/condensation catalysts comprises at least one acid ester selected from methyl fluorosulfonate, methyl chlorosulfonate, dimethyl sulfate, diethylsulfate, methylnitrate, and ethylnitrate.

10. The method of any one of clauses 1-9, wherein the one or more aprotic hydrolysis/condensation catalysts comprises at least one acid chloride selected from methanesulfonylchloride, ethanesulfonylchloride, benzenesulfonylchloride, and p-toluenesulfonylchloride.

11. The method of any one of clauses 1-10, wherein the one or more aprotic hydrolysis/condensation catalysts comprises at least one acid anhydride selected from methanesulfonic anhydride, trifluoromethanesulfonic anhydride, ethanesulfonic anhydride, benzenesulfonic anhydride, p-toluenesulfonic anhydride, and dodecylbenzenesulfonic anhydride.

12. The method of any one of clauses 1-11, wherein the one or more aprotic hydrolysis/condensation catalysts comprises at least one inorganic anhydride selected from dinitrogen pentoxide, sulfur trioxide, and phosphorus pentoxide.

13. The method of any one of clauses 1-12, wherein the organoalkoxysilane is one or more selected from tolylethylmethyldimethoxysilane (TEM), 3-cyanobutylmethyldimethoxysilane, dimethyldi-n-butoxysilane, and phenylmethyldimethoxysilane.

14. The method of any one of clauses 1-13, wherein corrosion of the conductor during treatment with the dielectric enhancement fluid is reduced or eliminated by the use of the one or more aprotic hydrolysis/condensation catalysts in place of protic strong acid catalysts.

15. The method of clause 14, wherein the conductor comprises aluminum, and wherein corrosion of the aluminum is reduced or eliminated.

16. The method of any one of clauses 1-15, wherein a PE retention of greater than 0.5 wt % is achieved.

17. A method for catalyzing the hydrolysis/condensation reaction of organooxysilanes, comprising contacting, under suitable reaction conditions, at least one organooxysilane with one or more aprotic hydrolysis/condensation catalysts for said organooxysilane selected from:

$Y_pZ_qSi(A^1)_n$, wherein formula (i)

n=1 to 3, p+q=4−n),

Y is an organo group $R^1$, and Z is an oxyorgano group $OR^2$, where, in each instance, $R^1$ and $R^2$ are independently selected from alkyl, aryl, or alkaryl, any of which alkyl, aryl, or alkaryl groups may also contain one or more hetero atoms selected from nitrogen, phosphorus, oxygen, sulfur, chlorine, bromine, fluorine, and iodine, and $A^1$ is an anion of a monoprotic strong acid selected from sulfonate, nitrate, chloride, bromide, or iodide; and/or $(Y_pZ_qSi)_2A^2$, wherein formula (ii)

p+q=3,

Y and Z are defined as for formula (i), and $A^2$ is an anion of a diprotic strong acid selected from sulfate or chromate; and/or $(Y_pZ_qSi)_3A^3$, wherein formula (iii)

p+q=3

Y and Z are defined as for formula (i), and $A^3$ is an anion of a triprotic strong acid selected from phosphate; and/or formula (iv)

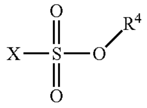 , wherein

X is F, Cl, $R^3$, or —$OR^5$, where $R^5$ is methyl or ethyl, and $R^3$ and $R^4$ are independently defined as for $R^1$; and/or formula (v)

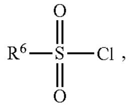

wherein $R^6$ is defined as for $R^1$; and/or formula (vi)

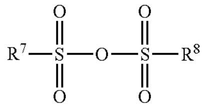 , wherein $R^7$ and $R^8$ are independently defined as for $R^1$; and/or methyl nitrate, ethyl nitrate, dinitrogen pentoxide, sulfur trioxide, and phosphorus pentoxide, wherein oligomerization of the organoalkoxysilane monomers is catalyzed.

18. The method of clause 17, wherein independently for $R^1$, $R^2$, $R^3$, $R^4$, $R^6$, $R^7$ and $R^8$:

alkyl is linear or branched $C_{1-6}$ alkyl;

aryl is phenyl or substituted phenyl having one or more substituents independently selected from linear or branched $C_{1-12}$ alkyl, or naphthyl; and alkaryl is —$C_{1-6}$ alkyl phenyl, any of which alkyl, aryl, or alkaryl groups may also contain one or more hetero atoms selected from nitrogen, phosphorus, oxygen, sulfur, fluorine, chlorine, bromine, and iodine.

19. The method of clause 17 or 18, wherein independently for $R^1$, $R^2$, $R^3$, $R^4$, $R^6$, $R^7$ and $R^8$:

alkyl is selected from methyl, ethyl, isopropyl, and tert-butyl;

aryl is selected from phenyl, tolyl, naphthyl, and dodecylphenyl; and alkaryl is selected from phenethyl, benzyl, and phenylisopropyl; any of which alkyl, aryl, or alkaryl groups may also contain one or more hetero atoms selected from nitrogen, phosphorus, oxygen, sulfur, fluorine, chlorine, bromine, and iodine.

20. The method of any one of clauses 17-19, wherein $A^1$ in formula (i) is the anion of a monoprotic acid selected from methanesulfonate, trifluoromethanesulfonate, benzenesulfonate, p-toluenesulfonate, chlorosulfonate, fluorosulfonate, perfluorobutanesulfonate, nitrate, chloride, bromide, and iodide.

21. The method of any one of clauses 17-20, wherein $A^2$ in formula (ii) is sulfate.

22. The method of any one of clauses 17-21, wherein $A^3$ in formula (iii) is the anion of a triprotic strong acid selected from phosphate.

23. The method of any one of clauses 17-22, wherein the one or more aprotic hydrolysis/condensation catalyst comprises at least one selected from TIPS triflate (triisopropylsilyltrifluoromethanesulfonate), DTBS ditriflate (Di-tert-butylsilylbis(trifluoromethanesulfonate), and TTMSP (tris(trimethylsilyl)phosphate).

24. The method of any one of clauses 17-23, wherein the one or more aprotic hydrolysis/condensation catalysts comprises at least one acid ester selected from methyl methanesulfonate, ethyl methanesulfonate, methyl trifluoromethanesulfonate, methyl ethanesulfonate, isopropyl ethanesulfonate, methyl octanesulfonate, methyl benzenesulfonate, ethyl benzenesulfonate, methyl p-toluenesulfonate, and ethyl p-toluenesulfonate.

25. The method of any one of clauses 17-24, wherein the one or more aprotic hydrolysis/condensation catalysts comprises at least one acid ester selected from methyl fluorosulfonate, methyl chlorosulfonate, dimethyl sulfate, diethylsulfate, methylnitrate, and ethylnitrate.

26. The method of any one of clauses 17-25, wherein the one or more aprotic hydrolysis/condensation catalysts comprises at least one acid chloride selected from methanesulfonylchloride, ethanesulfonylchloride, benzenesulfonylchloride, and p-toluenesulfonylchloride.

27. The method of any one of clauses 17-26, wherein the one or more aprotic hydrolysis/condensation catalysts comprises at least one acid anhydride selected from methanesulfonic anhydride, trifluoromethanesulfonic anhydride, ethanesulfonic anhydride, benzenesulfonic anhydride, p-toluenesulfonic anhydride, and dodecylbenzenesulfonic anhydride.

28. The method of any one of clauses 17-27, wherein the one or more aprotic hydrolysis/condensation catalysts comprises at least one inorganic anhydride selected from dinitrogen pentoxide, sulfur trioxide, and phosphorus pentoxide.

29. The method of any one of clauses 17-28, wherein the organoalkoxysilane is one or more selected from tolylethylmethyldimethoxysilane (TEM), 3-cyanobutylmethyldimethoxysilane, dimethyldi-n-butoxysilane, and phenylmethyldimethoxysilane.

DETAILED DESCRIPTION OF THE INVENTION

One skilled in the art will recognize that, while it is useful to know how much of the organoalkoxysilane hydrolysis/condensation product is retained in the cable, how it is distributed among the cable regions is more critical. Organoalkoxysilane hydrolysis/condensation product contained in the cable interstices around the conductors will not help prevent water-treeing or failure of the cable insulation. Only material contained in the insulation will provide that protection. To that end, the "model cable" test described in U.S. Pat. No. 7,700,871 was modified as follows. Five or more tubes were prepared for each sample fluid as previously described, the tubes were aged in water (wet) or diatomaceous earth (dry) at the desired temperature, and periodically, each tube was removed, dried, cleaned, weighed to determine the cable retention, and replaced in the aging bath. At desired intervals, one tube was further analyzed after the determination of cable retention as follows. The sealed ends of the tube were removed and retained, the wire was pushed out of the tube, and the tube, wire and tube ends were cleaned.

Comparison of the weight of the tube and tube ends with the original weight of the tube quantifies the amount of hydrolysis/condensation product dissolved in the plastic insulation, hereinafter referred to as "PE retention", which is expressed as a wt % of the original tube weight. For example, a polyethylene tube which weighed 2.0000 g before the experiment and weighed 2.0200 g after the experiment would have a 1% PE retention value. Comparison of the weight of the wire with its original weight quantifies any corrosion occurring.

Figure 1:
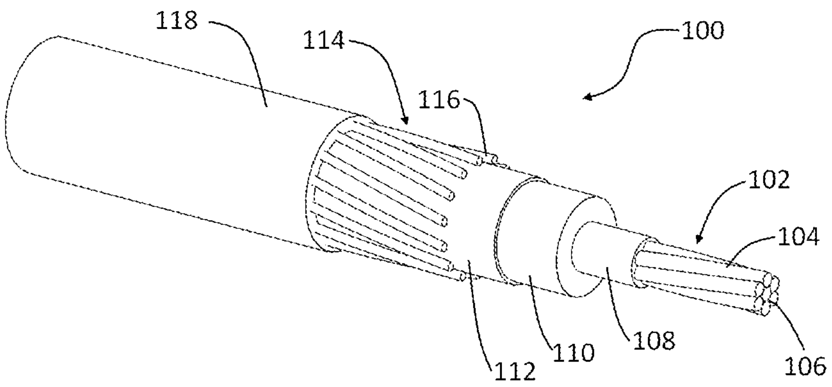
(prior art) FIG. 1
FIG. 1 shows a typical prior art construction of a medium voltage power cable.
Figure 2:
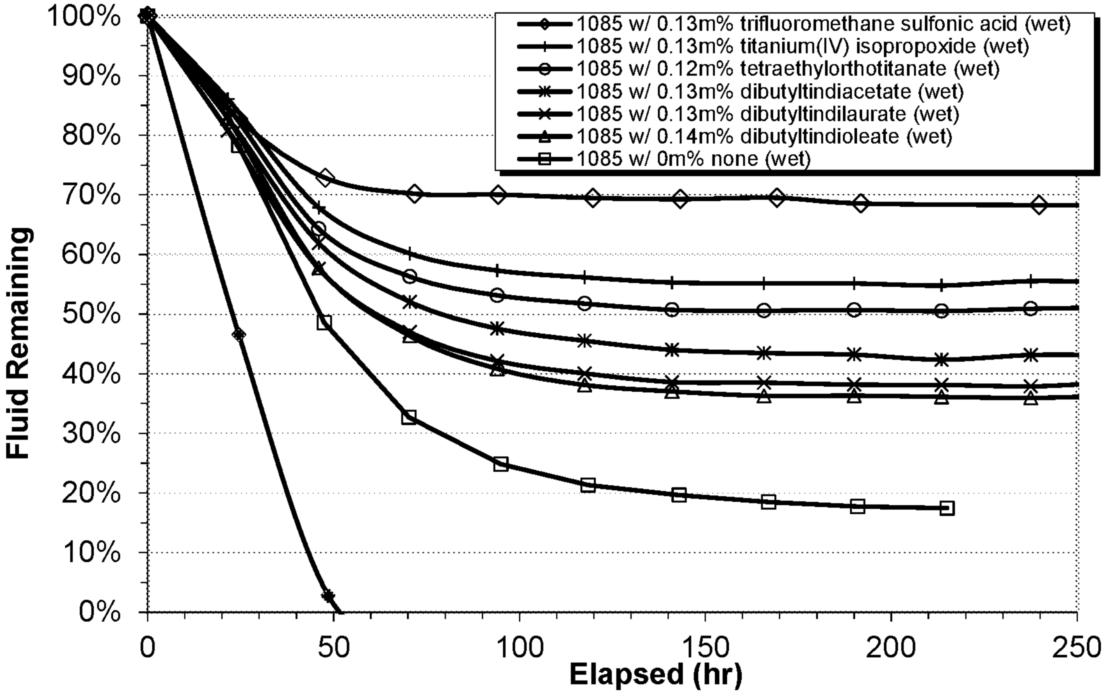
FIG. 2 shows, according to the prior art (U.S. Pat. No. 7,700,871), plots of elapsed time vs. % fluid remaining, demonstrating that in a model cable setup strong acids such as trifluoromethane sulfonic acid, provide significantly better retention of tolylethylmethyldimethoxysilane (TEM) hydrolysis and condensation products in the cable than organometallic catalysts of titanium or tin that were tested.
Figure 3:
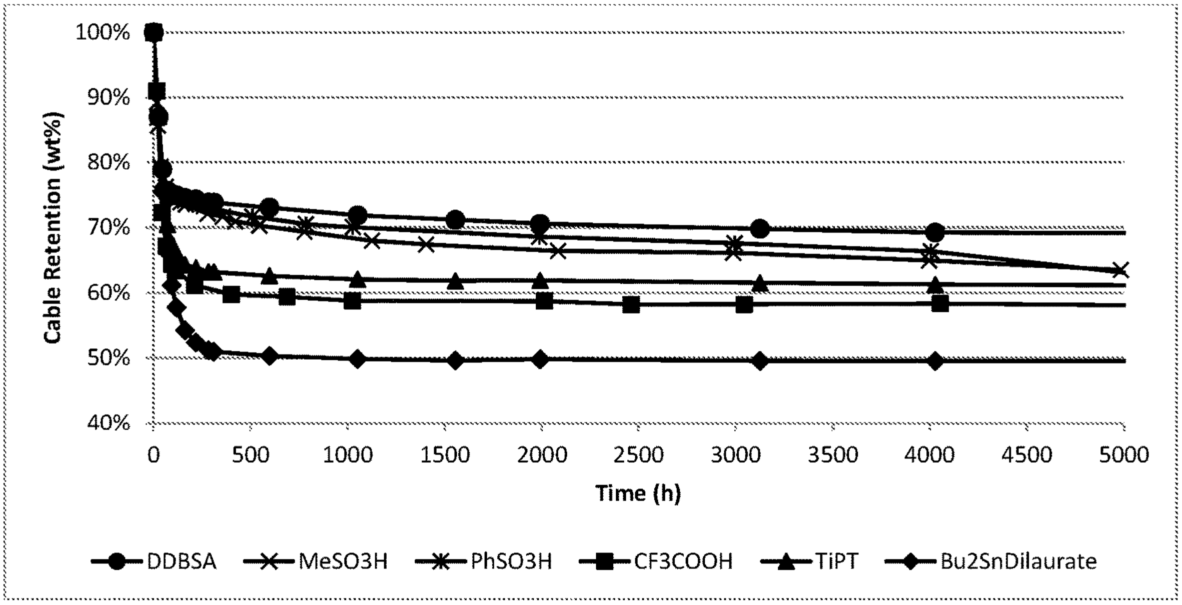
FIG. 3 shows, by way of non-limiting examples of the present invention, plots of elapsed time vs. cable retention of TEM hydrolysis/condensation products with various acids in the context of an extended model cable as described and tested herein. The results are consistent with the results in 7,700,871, and show a moderate but significant advantage for the strong acid catalysts.

Using the extended "model cable" test, experiments were conducted with TEM containing 0.21 mol % catalyst with aging at 55 °C in water. FIG. 3 shows cable retention over time for several catalysts. The retention plateaus were somewhat higher than the corresponding results in 7,700,871 because the catalyst level was 0.21 mol % compared to 0.13 mol % in 7,700,871; however, the ordering of the various catalysts and the spacing between them were the same. The strong acid catalysts achieved an absolute level of cable retention 10% higher than the tetraisopropyltitanate catalyst and 20% higher than the dibutyltindilaurate catalyst. This corresponds to a 1.2-1.4 times improvement in cable retention. The weaker acid catalyst, trifluoroacetic acid gave cable retention slightly lower than the tetraisopropyltitanate but higher than the dibutyltindilaurate catalyst. These results correspond closely with the results in 7,700,871 and show a moderate but significant advantage in cable retention for the strong acid catalysts.

Figure 4:
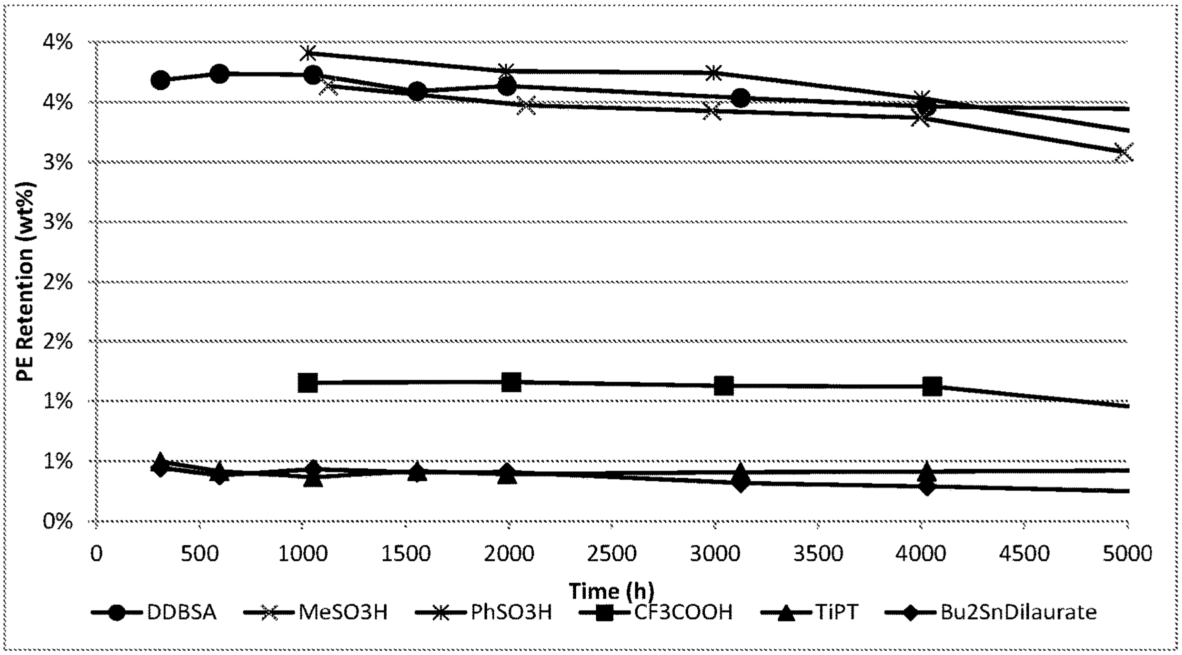
FIG. 4 shows, by way of non-limiting examples of the present invention, plots of elapsed time vs. polyethylene (PE) retention of TEM hydrolysis/condensation products with the various acids used for FIG. 3 in the context of the extended model cable as described and tested herein. The results demonstrate an 8-9 fold improvement in PE retention for the strong acid catalysts compared to the titanium and tin catalysts.

The extended "model cable" test also provides a quantitative measure of hydrolysis/condensation products dissolved in the polyethylene of the tubes, the PE retention. FIG. 4 plots these values over time for the same catalysts shown in FIG. 3. The differences between the PE retention values for the various catalysts is much more dramatic than the cable retention differences. The strong acid catalysts achieve 3-4 wt % PE retention compared to 1 wt % for the weaker acid ($CF_3COOH$) and less than 0.5 wt % for the titanium and tin catalysts. This represents an 8-9 fold improvement in PE retention for the strong acid catalysts compared to the titanium and tin catalysts.

Thus, the strong acid catalysts described in U.S. Pat. No. 7,700,871 represent the best existing method for retaining dielectric enhancement fluid components in the insulation of electric cables.

Aprotic Catalysts for the Hydrolysis/Condensation of Organoalkoxysilanes

Unless stated otherwise, the term "hydrolysis/condensation catalyst" or "hydrolysis condensation catalyst" or "hydrolysis and condensation catalyst", as used herein refers to a catalyst that catalyzes the hydrolysis and subsequent condensation of organoalkoxysilane monomers, each having at least two water reactive groups, to form organoalkoxysilane oligomers.

Triisopropylsilyltrifluoromethanesulfonate, TIPS triflate or TIPS Tf, is used in organic synthesis as a reagent to introduce a triisopropylsilyl protecting group. It is commercially available from several sources including Gelest, Inc., Sigma-Aldrich, and Alfa. Its use as a hydrolysis/condensation catalyst for alkoxysilanes has not been reported.

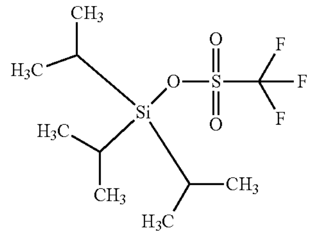

TIPS triflate (Triisopropylsilyl trifluoromethanesulfonate)

A number of structurally similar silane derivatives are also available commercially including, t-butyldimethylsilyltrifluoromethanesulfonate, di-t-butylisobutylsilyltrifluoromethanesulfonate, di-t-butylsilylbis(trifluoromethanesulfonate), di-isopropylsilylbis(trifluoromethanesulfonate), triethylsilyl trifluoromethanesulfonate, trimethylsilylbenzenesulfonate, trimethylsilylchlorosulfonate, trimethylsilylmethanesulfonate, trimethylsilylperfluorobutanesulfonate, and trimethylsilyltrifluoromethanesulfonate.

These materials are representative of Class (i) structures (Formula (i) structures), $R_p(OR)_qSiA^1_n$ (n=1 to 3 and p+q=4−n) where R is an organo group including alkyl groups such as methyl, ethyl, isopropyl, and tert-butyl; aryl groups such as phenyl, tolyl, naphthyl, and dodecylphenyl; alkaryl groups such as phenethyl, benzyl, and phenylisopropyl; any of the aforementioned organo groups also containing one or more hetero atoms such as nitrogen, phosphorus, oxygen, sulfur, chlorine, bromine, and iodine, and OR is an oxyorgano group including oxyalkyl groups such as methoxy, ethoxy, isopropoxy, and tert-butoxy; oxyaryl groups such as phenoxy, tolyloxy, naphthyloxy, and dodecylphenoxy; oxyalkaryl groups such as phenylethoxy, benzoxy, phenylisopropoxy; and any of the aforementioned oxyorgano groups also containing one or more hetero atoms such as nitrogen, phosphorus, oxygen, sulfur, fluorine, chlorine, bromine, and iodine in addition to the oxygen atom terminating the group. In this structural class, $A^1$ is the anion of a strong, monoprotic acid. For example, $A^1$ can include methanesulfonate, trifluoromethanesulfonate, benzenesulfonate, p-toluenesulfonate, chlorosulfonate, fluorosulfonate, perfluorobutanesulfonate, nitrate, chloride, bromide, and iodide.

Class (i) Generic Structures

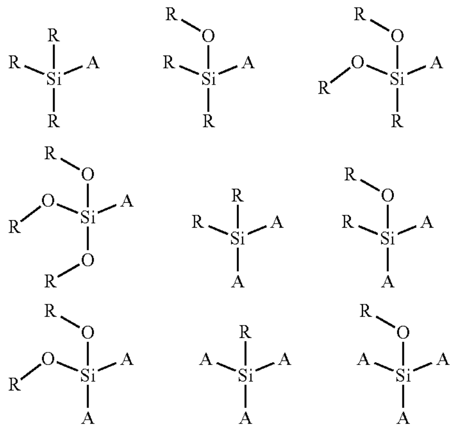

Class (ii) structures (Formula (ii) structures), $(R_p(OR)_qSi)_2A^2$ (p+q=3), where R and OR are the same as described for Class (i), differ from Class (i) in that $A^2$ is the anion of a diprotic strong acid such as sulfate or chromate. Commercial examples of Class (ii) include bis(trimethylsilyl)sulfate and bis(triphenylsilyl)chromate.

Class (ii) Generic Structures

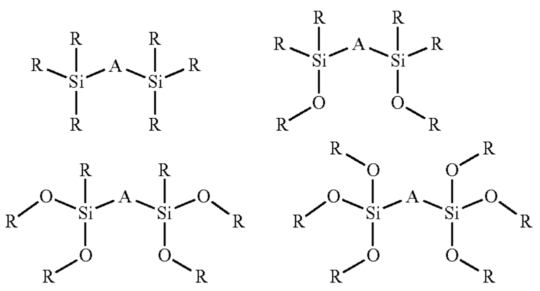

Class (iii) structures (Formula (iii) structures), $(R_p(OR)_qSi)_3A^3$ (p+q=3), where R and OR are the same as described for Class (i), differ from Class (i) in that $A^3$ is the anion of a triprotic strong acid such as phosphate. A commercial example of Class (iii) is tris(trimethylsilyl)phosphate available from Gelest.

Class (iii) Generic Structures

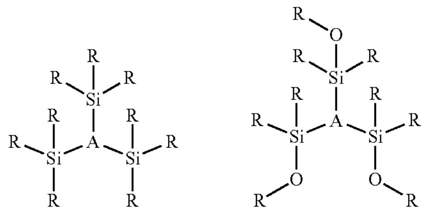

-continued

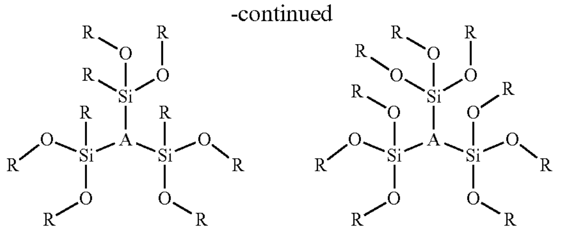

Class (iv), (v), and (vi) structures are derivatives of strong acids including acid esters, acid chlorides and acid anhydrides, respectively. Illustrated here are derivatives of organosulfonic acids where R is the same as described for Class (i) structures, and $R^1$ is the same as described for R and may be the same as or different from R within any particular representative of the class. Representative members of Class (iv) include but are not limited to methyl methanesulfonate, ethyl methanesulfonate, methyl trifluoromethanesulfonate, methyl ethanesulfonate, isopropyl ethanesulfonate, methyl octanesulfonate, methyl benzenesulfonate, ethyl benzenesulfonate, and methyl p-toluenesulfonate. Class (iv) can also include esters of other strong acids such as methyl fluorosulfonate, methyl chlorosulfonate, dimethyl sulfate, diethylsulfate, methylnitrate, and ethylnitrate. Representative members of Class (v) include but are not limited to methanesulfonylchloride, ethanesulfonylchloride, benzenesulfonylchloride, p-toluenesulfonylchloride, and benzenesulfonylfluoride. Representative members of Class (vi) include, but are not limited to methanesulfonic anhydride, trifluoromethanesulfonic anhydride, ethanesulfonic anhydride, benzenesulfonic anhydride, and p-toluenesulfonic anhydride. Inorganic anhydrides such as dinitrogen pentoxide, sulfur trioxide, and phosphorus pentoxide could also be included in the Class (vi) catalyst structures. The toxicity and/or explosivity of some members of Classes (iv), (v), and (vi) may prohibit their use even though they may be effective catalysts for the hydrolysis and condensation of alkoxysilanes.

Class (iv), (v), and (vi) Generic Structures

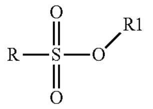

Acid Ester

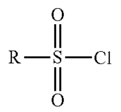

Acid Chloride

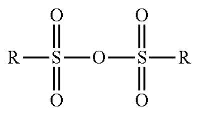

Acid Anhydride

Example 1

An Extended "Model Cable" Test was Used to Compare the Performance of a Typical Strong Acid Catalyst, DDBSA, with Several Examples of the Acid Anion Silanes of Class (i) and Class (iii)

Figure 5:
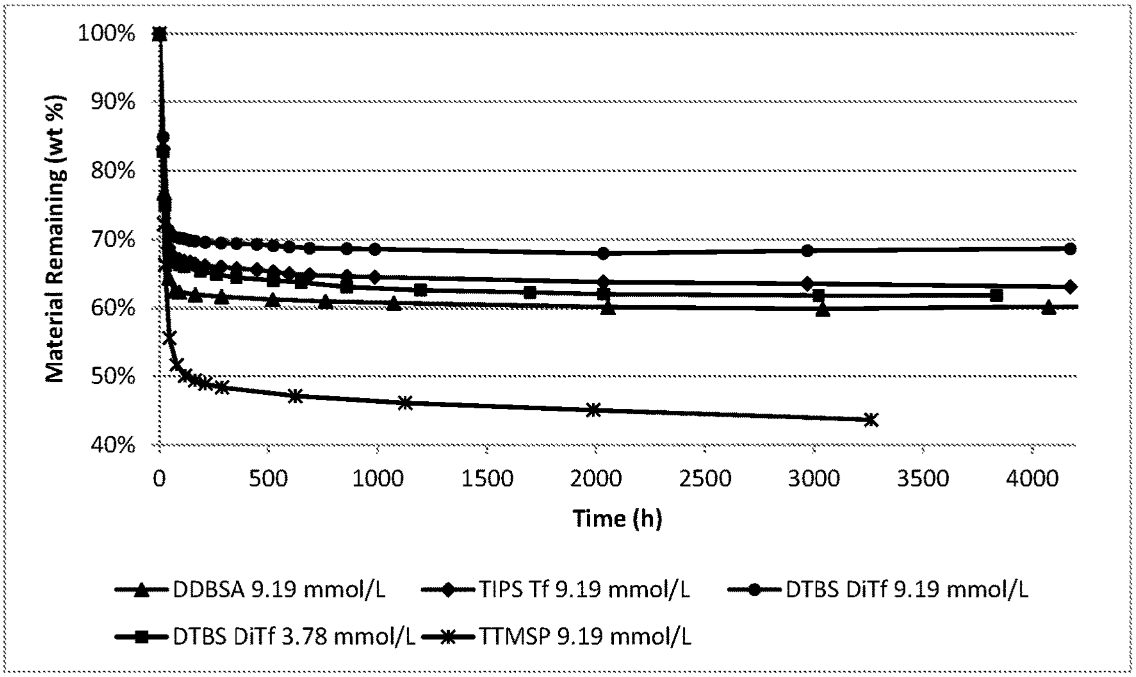
FIG. 5 shows, by way of non-limiting examples of the present invention, plots of elapsed time vs. cable retention of phenylmethyldimethoxysilane (PhMe) hydrolysis/condensation products with various acid anion catalysts in the context of the extended model cable as described and tested herein.

The extended "model cable" test was used to compare the performance of a typical strong acid catalyst, DDBSA, with several examples of the acid anion silanes of Class (i) and Class (iii). These tests were performed with phenylmethyldimethoxysilane (PhMe) as substrate primarily using a catalyst concentration of 9.19 mmol/L. Five tubes were prepared for each catalyst, DDBSA (dodecylbenzesulfonic acid), TIPS triflate (triisopropylsilyltrifluoromethanesulfonate), DTBS ditriflate (Di-tert-butylsilylbis(trifluoromethanesulfonate), and TTMSP (tris(trimethylsilyl)phosphate), and the tubes were aged in tap water at 55 °C. DTBS ditriflate has two "acid anion" groups, so a set of tubes was also prepared with 3.78 mmol/L DTBS ditriflate. The cable retentions for these experiments are shown in FIG. 5. DTBS ditriflate at 9.19 mmol/L gave about 70% cable retention while TIPS triflate and DTBS ditriflate at the lower concentration achieved cable retention in the lower 60% range, slightly ahead of DDBSA at 60%. TTMSP was much lower at around 45% cable retention.

Figure 6:
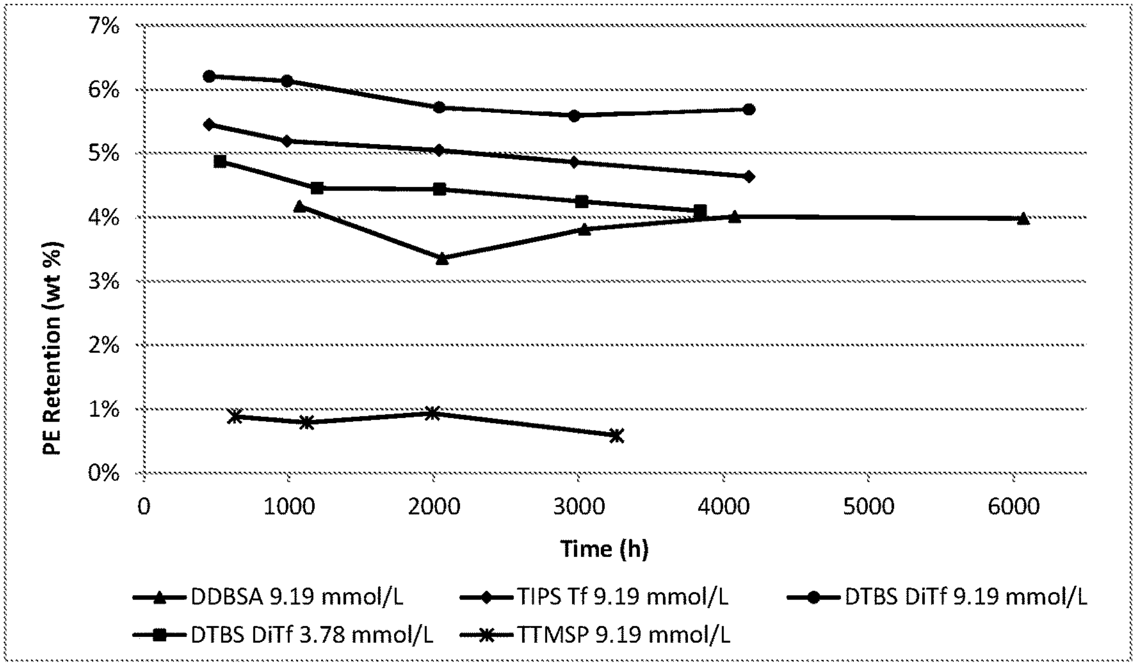
FIG. 6 shows, by way of non-limiting examples of the present invention, plots of elapsed time vs. PE retention of PhMe hydrolysis/condensation products with the various acid anion catalysts used for FIG. 5 in the context of the extended model cable as described and tested herein.

Referring to FIG. 6, the PE retention values for the acid anion silanes compared to DDBSA were qualitatively similar to the Cable retention results in that DTBS DiTf at 9.19 mmol/L performed significantly better than TIPS Tf or DDBSA at 9.19 mmol/L. DTBS DiTf at 3.78 mmol/L had slightly lower PE retention than TIPS Tf at 9.19 mmol/L but significantly better PE retention than DDBSA at 9.19 mmol/L. TTMSP gave much lower PE retention than the other acid anion catalysts or DDBSA. These results are summarized in Table 1. This data shows that, at the same level of catalyst equivalents, some of the Class (i) aprotic catalysts perform significantly better than a typical acid catalyst for the retention of phenylmethyldimethoxysilane.

TABLE 1

PE Retention of $PhMeSi(OMe)_2$ with Acid Anion Silane Catalysts.
PE Retention of $PhMeSi(OMe)_2$ with Acid Anion Silane Catalysts

| Catalyst | DDBSA 9.161 mmol/l | TIPS Tf 9.159 mmol/l | DTBS DiTf 9.160 mmol/l | DTBS DiTf 3.765 mmol/l | TTMSP 9.159 mmol/l |
|---|---|---|---|---|---|
| | 3.98% | 4.64% | 5.69% | 4.10% | 0.58% |
| | 4.01% | 4.86% | 5.58% | 4.24% | 0.58% |
| | 3.81% | 5.04% | 5.72% | 4.44% | 0.93% |
| | 3.36% | 5.19% | 6.13% | 4.46% | 0.79% |
| | 4.17% | 5.45% | 6.21% | 4.87% | 0.88% |
| Average | 3.87% | 5.03% | 5.87% | 4.42% | 0.75% |

Example 2

Figure 7:
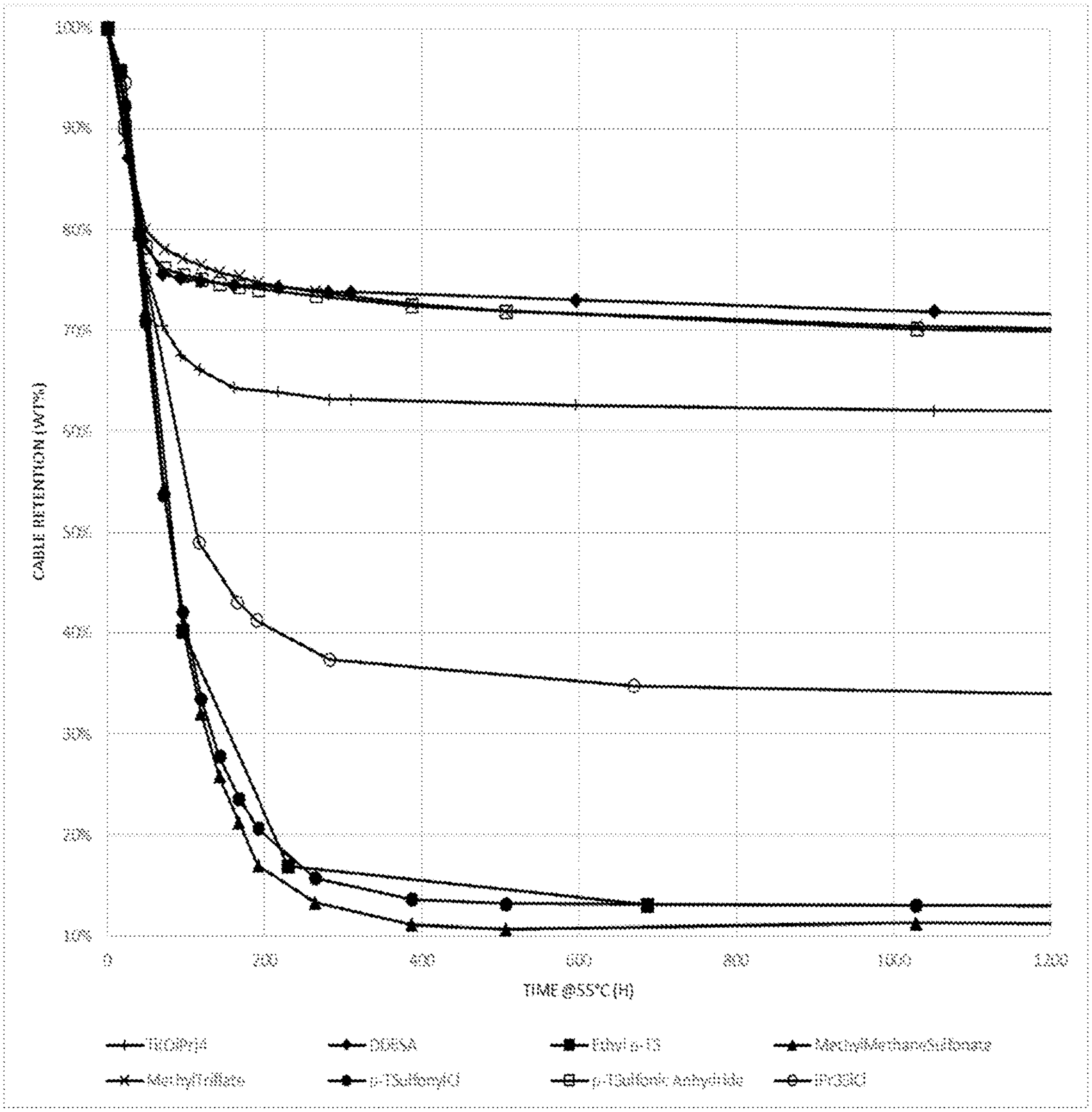
FIG. 7 shows, by way of non-limiting examples of the present invention, plots of elapsed time vs. cable retention of tolylethylmethyldimethoxysilane (TEM) hydrolysis/condensation products with various catalysts in the context of the extended model cable as described and tested herein. The plots compare the performance of a typical strong acid catalyst, DDBSA, and a typical organometallic catalyst, tetraisopropyltitanate, with several examples of aprotic catalysts according to the present invention.

The Extended "Model Cable" Test was Used to Compare the Performance of a Typical Strong Acid Catalyst, DDBSA, and a Typical Organometallic Catalyst, Tetraisopropyltitanate, with Several Examples of Classes (iv), (v), and (vi) Catalysts and One Additional Class (i) Catalyst The extended "model cable" test was also run to compare the performance of a typical strong acid catalyst, DDBSA, and a typical organometallic catalyst, tetraisopropyltitanate, with several examples of Classes (iv), (v), and (vi) catalysts and one additional Class (i) catalyst. These experiments used tolylethylmethyldimethoxysilane (TEM) as the substrate at a catalyst concentration of 9.2 mmol/L for all catalysts except p-toluenesulfonic anhydride. Since the anhydride could have two catalytically active sites per molecule, its concentration was cut to 4.6 mmol/L. Five tubes were prepared for each catalyst in TEM solution, and the tubes were aged in tap water at 55 °C. The cable retentions of the eight catalysts are shown in FIG. 7. DDBSA, methyltriflate, and p-toluenesulfonic anhydride gave cable retentions above 70%, with tetraisopropyltitanate somewhat lower. Triisopropylsilylchloride was intermediate at 35%, while the other potential catalysts were below 15%.

Figure 8:
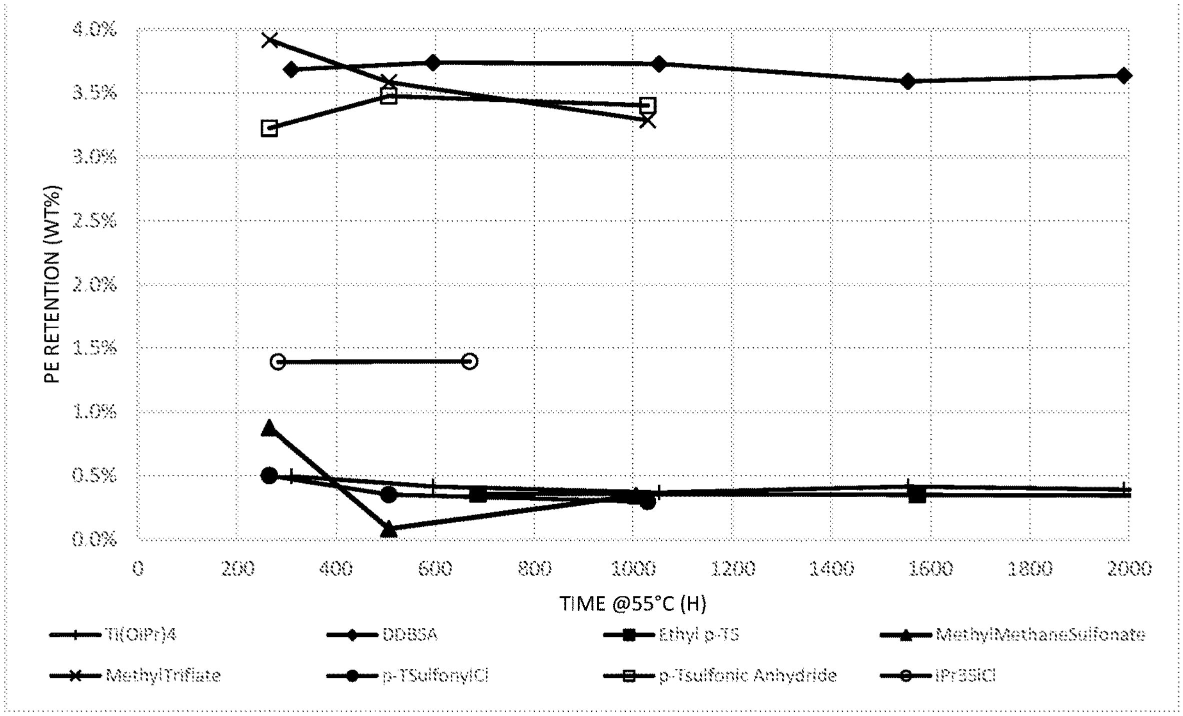
FIG. 8 shows, by way of non-limiting examples of the present invention, plots of elapsed time vs. PE retention of TEM hydrolysis/condensation products with the various catalysts used for FIG. 7 in the context of the extended model cable as described and tested herein.

The PE retentions for these same eight catalysts are shown in FIG. 8. The PE retentions of methyl triflate and p-toluenesulfonic anhydride were in the 3-4% range, comparable to the results for DDBSA and other strong acids. Triisopropylsilylchloride gave an intermediate PE retention value while methylmethanesulfonate was lower. Ethyl p-toluenesulfonate and p-toluenesulfonylchloride were at or below 0.5 wt %. Tetraisopropyltitanate had a PE retention below 0.5 wt % even though it gave a much better cable retention than triisopropylsilylchloride, methylmethanesulfonate, ethyl p-toluenesulfonate, and p-toluenesulfonylchloride.

Example 3

Figure 9:
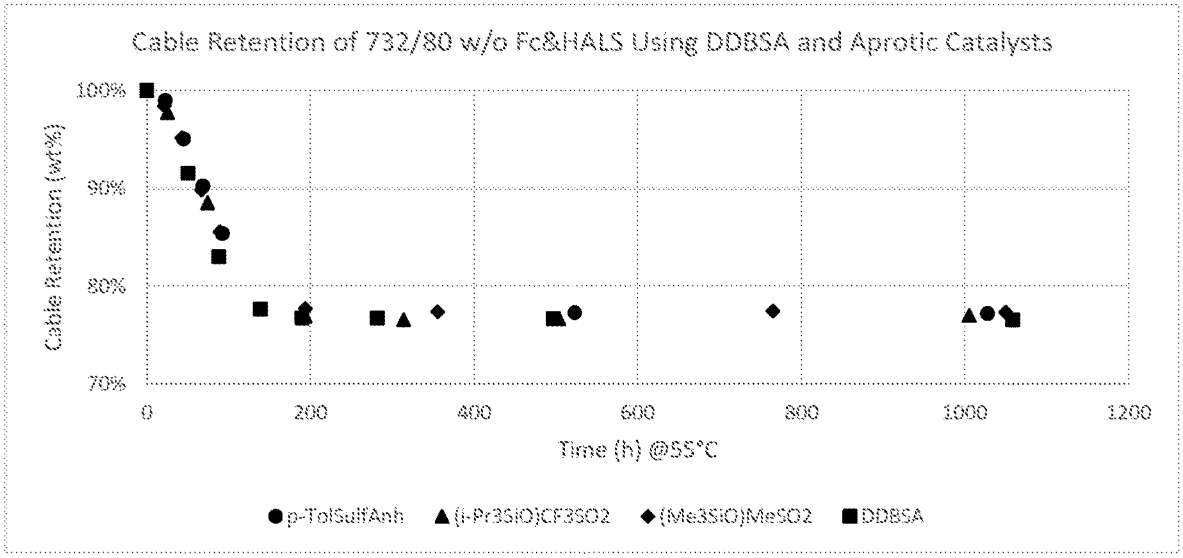
FIG. 9 shows, by way of non-limiting examples of the present invention, plots of elapsed time vs. cable retention of hydrolysis/condensation products of a multicomponent cable rejuvenation formulation with various aprotic catalysts, in comparison with DDBSA, in the context of the extended model cable as described and tested herein. The cable retentions of all four catalysts are virtually identical.

The Extended "Model Cable" Test was Used to Evaluate Aprotic Catalysts with a Multicomponent Cable Rejuvenation Formulation Several of the aprotic catalysts have also been evaluated in a multicomponent cable rejuvenation formulation containing 3-cyanobutylmethyldimethoxysilane, tolylethylmethyldimethoxysilane, a silane-bound antioxidant, and a silane-bound uv absorber. Catalysts including, trimethylsilylmethanesulfonate, triisopropylsilyltrifluoromethanesulfonate, and p-toluenesulfonic anhydride were tested to compare with a typical strong acid catalyst, dodecylbenzenesulfonic acid. The concentrations of the four catalysts were 9.61 mmol/L, 9.19 mmol/L, 9.19 mmol/L, and 9.17 mmol/L respectively. FIG. 9 shows the cable retention of these formulations. The cable retentions of all four catalysts are virtually identical.

Figure 10:
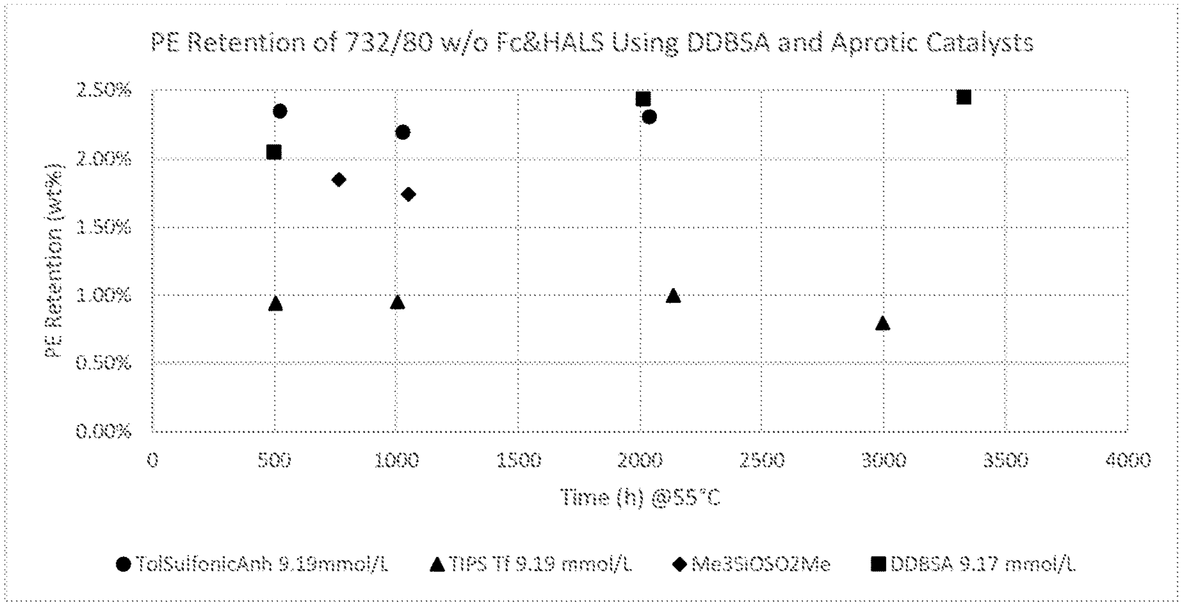
FIG. 10 shows, by way of non-limiting examples of the present invention, plots of elapsed time vs. PE retention of hydrolysis/condensation products of the multicomponent cable rejuvenation formulation with the various catalysts used for FIG. 9.

In contrast, the PE retentions shown in FIG. 10 show dodecylbenzenesulfonic acid, p-toluenesulfonic anhydride, and trimethylsilylmethanesulfonate give fairly similar retentions, but triisopropylsilyltrifluoromethanesulfonate is considerably lower. It should be noted that p-toluenesulfonic anhydride contains potentially two catalyst moieties per molecule while the other catalysts have only one.

Example 4

The Extended "Model Cable" Test was Used to Compare Several Aprotic Catalysts of the Present Invention to a Strong Acid Catalyst, DDBSA, for the Exudation of Phenylmethyldimethoxysilane Using the extended "model cable" test, several aprotic catalysts of the present invention were compared to a strong acid catalyst, DDBSA, for the exudation of phenylmethyldimethoxysilane. For this example, the optional anti-oxidant additive was omitted from the fluid formulations. Specifically, changes in the weight of the aluminum wires were compared to assess any corrosion effects. From Table 2, the aluminum wires in samples using DDBSA declined in weight indicating some corrosion. In contrast, all the wires in the aprotic catalyst samples gained weight, likely due to the formation of an adherent coating. As a result, it may be possible to reduce or eliminate the need for the anti-oxidant additive when aprotic catalysts are used.

TABLE 2

Weight Changes of Al Wire Over Time in PhMe Exudation
Wt Changes of Al Wire over Time in PhMe Exudation

| Catalyst | | Al Wire % Wt Change with Time | | | |
|---|---|---|---|---|---|
| Type | Conc (mmol/L) | 1000 h | 2000 h | 3000 h | 4000 h |
| DDBSA | 9.161 | | −0.01 | −0.03 | −0.03 |
| TIPS Tf | 9.159 | 0.06 | 0.05 | 0.11 | 0.15 |
| DTBS Tf | 9.160 | 0.09 | 0.08 | 0.08 | 0.21 |
| DTBS Tf | 3.765 | 0.04 | 0.03 | 0.07 | 0.15 |
| TTMSP | 9.159 | 0.04 | 0.04 | 0.05 | |

A similar study was conducted with DDBSA at various concentrations compared to some of the aprotic catalysts of the present invention for the exudation of a fully formulated cable rejuvenation fluid. The results are shown in Table 3. As the concentration of DDBSA is increased, the weight loss of the aluminum wires generally increases as would be expected. Trim ethylsilylmethanesulfonate produced a weight gain in the aluminum wires for the fully formulated rejuvenation fluid as it did for phenylmethyldimethoxysi lane. Toluenesulfonic anhydride did not give a definitive trend, while triisopropylsilyltrifluoromethane sulfonate showed a weight loss in contrast to its result with phenylmethyldimethoxysilane. These results indicate that strong acid catalysts consistently produce a variable level of weight loss of the aluminum wires while aprotic catalysts of the present invention can lead to a consistent weight gain for some combinations of catalyst and fluid.

TABLE 3

Weight Changes of Al Wire Over Time in Rejuvenation Fluid Exudation
Wt Changes of Al Wire over Time in Rejuvenation Fluid Exudation

| Catalyst | | Al Wire % Wt Change with Time | | | |
|---|---|---|---|---|---|
| Type | Conc (mmol/L) | 1000 h | 2000 h | 3000 h | 4000 h |
| DDBSA | 18.46 | −0.03% | −0.01% | −0.04% | −0.03% |
| DDBSA | 27.43 | −0.01% | −0.04% | −0.03% | |
| DDBSA | 45.79 | −0.06% | −0.07% | −0.04% | −0.04% |
| DDBSA | 61.21 | −0.07% | −0.14% | −0.06% | −0.06% |
| DDBSA | 76.49 | −0.04% | −0.08% | −0.12% | |
| DDBSA | 91.75 | −0.11% | −0.07% | −0.08% | |
| DDBSA | 107.22 | −0.08% | −0.12% | | |
| DDBSA | 122.93 | −0.25% | −0.15% | | |
| (Me3SiO)MeSO2 | 12.21 | 0.07% | 0.05% | | |
| p-TolSulfAnhydride | 9.19 | 0.08% | −0.01% | | |
| TIPS Tf | 9.19 | −0.02% | −0.06% | −0.07% | −0.08% |

The invention claimed is:

1. A method for enhancing the dielectric properties of an electrical cable having a central stranded conductor encased in a polymeric insulation jacket and having an interstitial void volume in the region of the conductor, the method comprising introducing a dielectric enhancement fluid composition into the interstitial void volume, wherein the composition comprises:

a. at least one organoalkoxysilane; and b. one or more aprotic hydrolysis/condensation catalysts for said organoalkoxysilane(s), selected from:

$Y_pZ_qSi(A^1)_n$, wherein formula (i)

n=1 to 3, p+q=4−n,

Y is an organo group $R^1$, and Z is an oxyorgano group $OR^2$, where $R^1$ and $R^2$ are independently selected from alkyl, aryl, or alkaryl, any of which alkyl, aryl, or alkaryl groups may also contain one or more hetero atoms selected from nitrogen, phosphorus, oxygen, sulfur, chlorine, bromine, fluorine, and iodine, and $A^1$ is an anion of a monoprotic strong acid selected from sulfonate, nitrate, chloride, bromide, or iodide; and/or $(Y_pZ_qSi)_2A^2$, wherein formula (ii)

p+q=3,

Y and Z are defined as for formula (i), and $A^2$ is an anion of a diprotic strong acid selected from sulfate or chromate; and/or

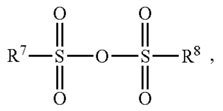

wherein $R^7$ and $R^8$ are independently defined as for $R^1$; and/or methyl nitrate or ethyl nitrate, wherein oligomerization of the organoalkoxysilane monomers is catalyzed and dielectric properties are enhanced by retained oligomers.

2. The method of claim 1, wherein independently for $R^1$, $R^2$, $R^3$, $R^4$, $R^6$, $R^7$, and $R^8$:

alkyl is linear or branched $C_{1-6}$ alkyl;

aryl is phenyl or substituted phenyl having one or more substituents independently selected from linear or branched $C_{1-12}$ alkyl, or naphthyl; and alkaryl is —$C_{1-6}$ alkyl phenyl, any of which alkyl, aryl, or alkaryl groups may also contain one or more hetero atoms selected from nitrogen, phosphorus, oxygen, sulfur, fluorine, chlorine, bromine, and iodine.

3. The method of claim 2, wherein independently for $R^1$, $R^2$, $R^3$, $R^4$, $R^6$, $R^7$, and $R^8$:

alkyl is selected from methyl, ethyl, isopropyl, and tert-butyl;

aryl is selected from phenyl, tolyl, naphthyl, and dodecylphenyl; and alkaryl is selected from phenethyl, benzyl, and phenylisopropyl; any of which alkyl, aryl, or alkaryl groups may also contain one or more hetero atoms selected from nitrogen, phosphorus, oxygen, sulfur, fluorine, chlorine, bromine, and iodine.

4. The method of claim 1, wherein $A^1$ in formula (i) is the anion of a monoprotic acid selected from methanesulfonate, trifluoromethanesulfonate, benzenesulfonate, p-toluenesulfonate, chlorosulfonate, fluorosulfonate, perfluorobutanesulfonate, nitrate, chloride, bromide, and iodide.

5. The method of claim 1, wherein $A^2$ in formula (ii) is sulfate.

6. The method of claim 1, wherein the one or more aprotic hydrolysis/condensation catalyst comprises at least one selected from TIPS triflate (triisopropylsilyltrifluoromethanesulfonate), and DTBS ditriflate (Di-tert-butylsilylbis(trifluoromethanesulfonate).

7. The method of claim 1, wherein the one or more aprotic hydrolysis/condensation catalysts comprises at least one acid ester selected from methylnitrate, and ethylnitrate.

8. The method of claim 1, wherein the one or more aprotic hydrolysis/condensation catalysts comprises at least one acid anhydride selected from methanesulfonic anhydride, trifluoromethanesulfonic anhydride, ethanesulfonic anhydride, benzenesulfonic anhydride, p-toluenesulfonic anhydride, and dodecylbenzenesulfonic anhydride.

9. The method of claim 1, wherein the organoalkoxysilane is one or more selected from tolylethylmethyldimethoxysilane (TEM), 3-cyanobutylmethyldimethoxysilane, dimethyldi-n-butoxysilane, and phenylmethyldimethoxysilane.

10. The method of claim 1, wherein corrosion of the conductor during treatment with the dielectric enhancement fluid is reduced or eliminated by the use of the one or more aprotic hydrolysis/condensation catalysts relative to use of protic strong acid catalysts.

11. The method of claim 10, wherein the conductor comprises aluminum, and wherein corrosion of the aluminum is reduced or eliminated.

12. The method of claim 1, wherein a PE retention of greater than 0.5 wt % is achieved.

* * * * *